Oct. 28, 1941.   A. H. GOREY   2,260,991
PHOTOGRAPHIC LENS BARREL ADJUSTING MEANS
Filed July 24, 1940   2 Sheets-Sheet 1

INVENTOR.
Archie H. Gorey
BY
Emery, Booth, Townsend, Miller and Neidner
his ATTORNEYS.

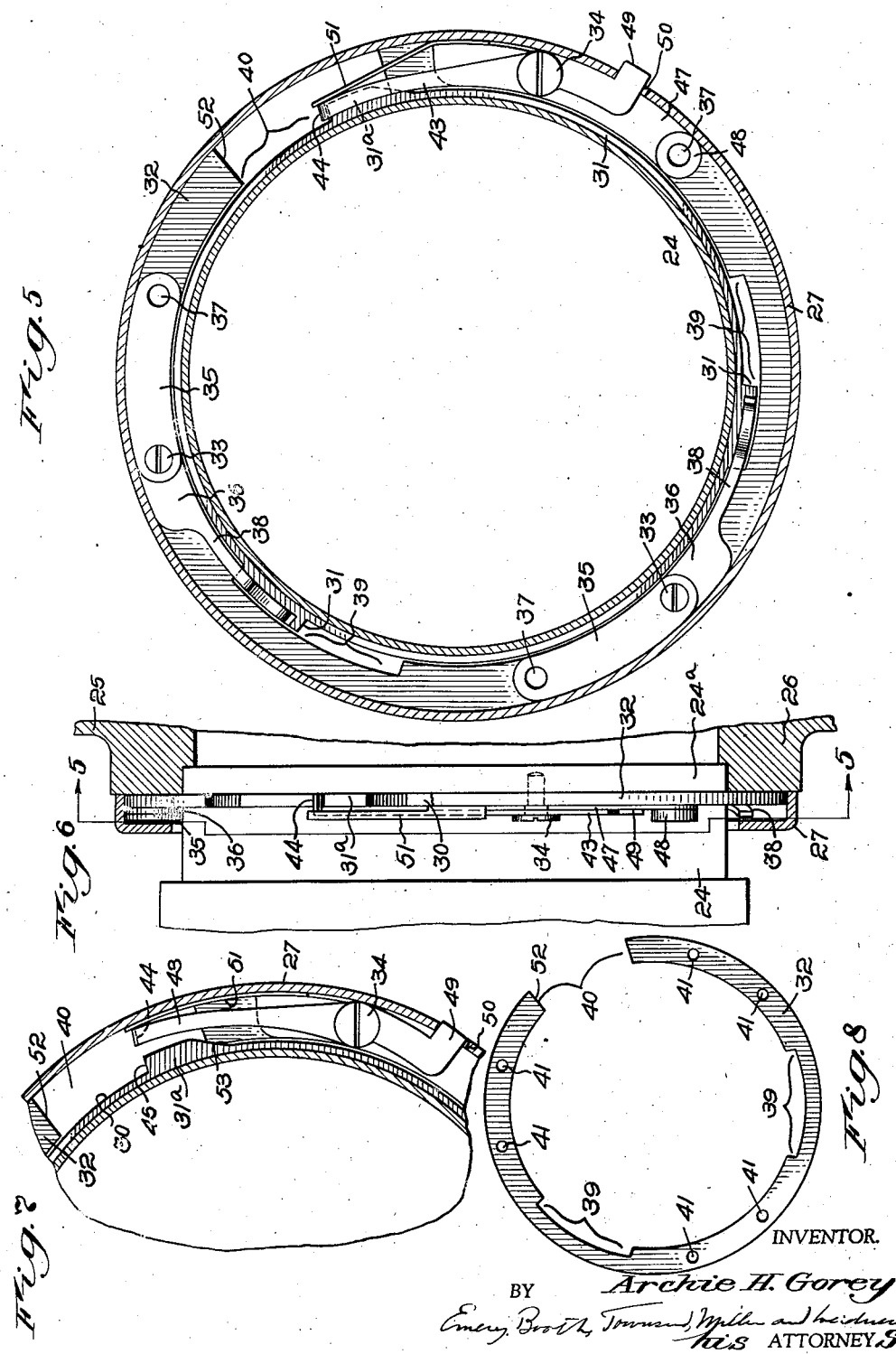

Patented Oct. 28, 1941

2,260,991

UNITED STATES PATENT OFFICE 2,260,991

PHOTOGRAPHIC LENS BARREL ADJUSTING MEANS

Archie H. Gorey, Irondequoit, N. Y., assignor to The Folmer Graflex Corporation, Rochester, N. Y., a corporation of Delaware Application July 24, 1940, Serial No. 347,263

16 Claims. (Cl. 88—57)

This invention relates to improved means for attaching photographic lens barrels to cameras in a manner permitting ready interchangeability of the lenses thereof.

In order that the principle of the invention may be readily understood, I have disclosed a single embodiment thereof in the accompanying drawings, wherein—

Fig. 5 is a larger scale, transverse section, on the line 5—5 of Fig. 6, and looking toward the right in such figure, to show certain internal parts of the structure;

Fig. 6 is a view mainly in vertical longitudinal section taken through the camera casing and showing a part of the lens barrel in its position upon the camera casing;

Fig. 7 is a fragmentary, transverse section similar to and on the enlarged scale of Fig. 5, showing the means for locking the lens barrel in the lens mount; and Fig. 8 is a detail in plan, on a smaller scale, of the index or spacing ring of the lens mount.

I am aware that there have heretofore been provided interchangeable mounts for photographic lenses, but each of them has had certain objections or presented certain difficulties, all of which have been overcome by my invention. The principal objects of my invention are to provide lens mounting means simple in construction and inexpensive to manufacture, which will hold the lens barrel in rigid alignment with or relation to the camera body and will lock the lens barrel in position, so that it cannot be accidentally disengaged. In accordance with my invention, a single embodiment only of which is herein disclosed and to which my invention is not limited, the lens barrel is provided with certain formations or a certain structure preventing the lens from being attached except in its correct position, such means providing for the positioning of the lens with great accuracy in its proper relation to the camera.

Figure 1:
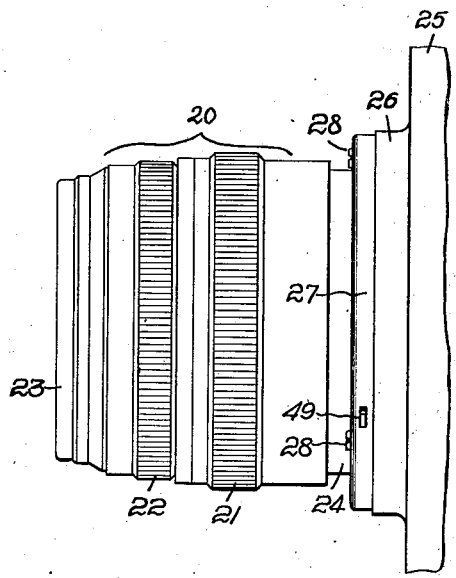
Fig. 1 is a side elevation of the lens barrel mounted upon the camera casing.
Figure 2:
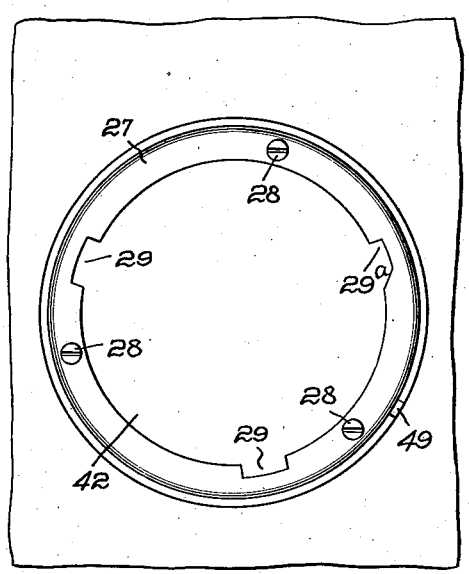
Fig. 2 represents in front elevation a part of the lens barrel mounting means and a part of the camera casing.

Referring more particularly to the drawings, the lens barrel composed of the several parts is indicated generally at 20 in Figs. 1 and 2. Such lens barrel is usually made up of and is here represented as provided with a focusing ring 21, a diaphragm adjusting ring 22 and a front lens cell 23. The lens barrel 20 is also shown as having an extension member or part consisting of the cylindrical portions 24, 24a, best shown in Fig. 3. The front wall of the camera casing is indicated at 25 in Figs. 1, 2 and 6, being shown in Figs. 1 and 6 as provided with a laterally extending cylindrical boss 26 having attached thereto a cover or mounting ring 27 by means of a suitable number of screws 28.

The said cover or mounting ring 27, as best shown in Fig. 2, is provided with a suitable number of radial notches, here shown as three, of which two notches 29, 29 are parallel sided while the notch 29a is of irregular shape. The purpose of the said notches will be later set forth.

Figure 3:
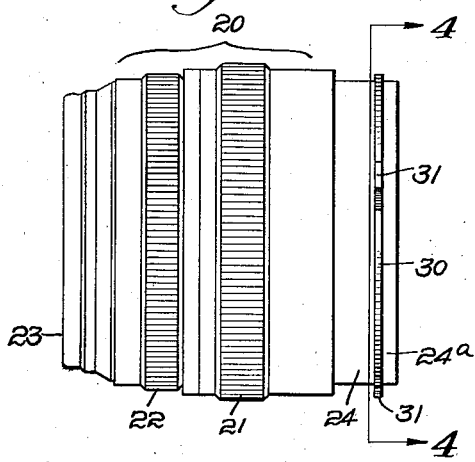
Fig. 3 is a side elevation of the lens barrel of Fig. 1 and also showing the locking structure in side elevation.
Figure 4:
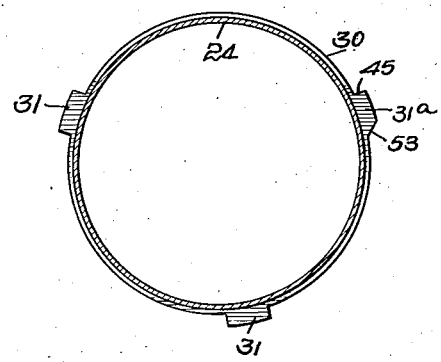
Fig. 4 is a transverse vertical section taken through the lens barrel on the line 4—4 of Fig. 3, and showing the locking formations or lugs.

The lens barrel extension member or part 24, 24a is preferably provided with an encircling ring 30, indicated in Figs. 3, 4 and 7, which at suitable intervals is provided with radially extending formations or bosses 31, 31, 31a. Within the scope of my invention, the ring 30 may be dispensed with and the said formations or bosses 31, 31, 31a may extend directly outward from the surface of the extension member 24, 24a, of which said ring, if employed, preferably forms an integral part, though it may be structurally separate but attached thereto.

As most clearly shown in Figs. 5 and 6, the laterally extending annular boss 26 of the camera casing 25 has attached thereto an index or spacing ring 32 which is separately shown in Fig. 8. The said index ring 32 is held to the said laterally extending boss 26 of the camera casing 25 by means of a suitable number of screws 33, 33 and a shoulder screw or screws 34. The said screws 33, 33 also pass through a suitable number of spacer plates 35, shown as two in number in Fig. 5, the said screws also passing through retaining springs 36, 36, one of which is provided in connection with each spacer plate 35. The said index ring 32, the springs 36, 36 and the spacer plates 35, 35 are also provided with holes 37 for the passage of the screws 28, 28 of the lens mounting ring or cover 27 to the laterally extending boss 26 of the camera casing 25. Each spring 36 is provided with an extending finger 38 for engaging with one of the formations or bosses 31, 31. This structure is most clearly shown in Fig. 5. The index ring 32 is provided with a suitable number of radially positioned recesses 39, 39, here shown as two in number, to provide for the reception of the formations or bosses 31, 31, and it is also provided with the cut-away portion 40 to receive the formation or boss 31a. The index ring 32 is also provided with clearance holes 41, 41 for the passage of the retaining screws hereinbefore referred to.

The laterally extending boss 26 of the camera casing 25 is provided with suitable tapped holes (not shown) to receive the screws 28, 28, shown in Fig. 2, the screws 33, 33, shown in Fig. 5, and the shoulder screw 34, shown in Fig. 5, for the purpose of attaching the said members to the laterally extending boss 26 of the camera casing 25.

The lens barrel or lens barrel structure 20, made up of the parts hereinbefore referred to, is so constructed as to receive lenses of various focal lengths. However, the cylindrical lens barrel extension member or part 24, 24a is always of the same dimensions, as are also the ring 30 of the said extension member 24, 24a, and the locking lugs 31, 31, 31a of the said ring 30, or of the lens barrel extension member. The said cylindrical extension member 24, 24a is inserted into the central opening 42, shown in Fig. 2, of the cover or mounting ring 27. The lens barrel 20 made up of its several parts is then turned or positioned so that the locking lug 31a will engage the opening 29a of the ring 27 and the locking lugs 31, 31 will engage the openings 29, 29 of the said mounting or cover ring 27. The said lens barrel 20 is, after such engagement of parts, turned in a clockwise direction, causing said lugs 31, 31, 31a also to be turned in a clockwise direction, until the said lugs 31, 31 are respectively engaged by the springs 38, 38, thus holding the lens barrel in position. The laterally extending boss 26 of the camera casing 25 is provided with an opening to receive the cylindrical extension 24, 24a. The springs 38, 38 cause the lugs 31, 31 to be held in contact with the face of the laterally extending boss 26 of the camera casing 25.

In order to prevent inadvertent removal of the lens barrel 20 from the part 26, 27 of the lens mount, I have provided locking means herein shown as consisting of a locking lever or latch arm 43 having a turned-down end 44 for engaging the face 45 of the lug 31a.

Overlying the index ring 32 is a spring base member 47 held to the laterally extending boss 26 of the camera casing 25 by means of the shoulder screw 34 and further held in position by one of the case screws 28 passing through a washer 48, through the hole 37 in the spring base member 47, through a hole 41 in the index ring 32, and finally threaded into said laterally extending boss 26 of the camera casing 25.

The locking lever or latch arm 43, previously referred to, is provided with a preferably L-shaped end formation 49 passing through an opening 50 in the lens mount, cover or mounting ring 27, so that it can be manually pressed. The said locking lever or latch arm 43 is caused to be slightly rotated in a contraclockwise direction under the influence of a spring 51 which is preferably an integral part of the spring case member 47. When pressure is applied manually to the said L-shaped end 49 of the locking lever or latch arm 43, the said lever or latch is caused to rotate slightly in a clockwise direction viewing Figs. 5 and 7, depressing the spring 51 and removing the turned-down end or lug 44 of the said lever or arm 43 from the radial or right angle face 45 of the boss 31a, as indicated in Fig. 7. The lens barrel 20 can now be turned in a contraclockwise direction until the said radial face 45 of the boss 31a contacts with the end formation 52 of the index ring 32. When in such position the lug 31a will be positioned behind the opening 29a and the lugs 31, 31 will be positioned behind the openings 29, 29 of the mounting or cover ring 27 (Fig. 2), thus allowing the lens barrel 20 composed of its several parts to be removed bodily from the lens mount—that is, from the boss 26 of the camera casing 25 and the cover or mounting ring 27.

As previously set forth, any lens having the barrel structure such as shown in Figs. 3 and 4, regardless of the focal length of the lens, if within the limit of the size of the opening 42 of the cover or mounting ring 27 of the lens mount, can be inserted in its proper place in the lens mount structure for use on any photographic camera provided with my invention.

When inserting a lens into the lens mount structure, the cylindrical extension 24, 24a with the integral ring 30 and lugs 31, 31, 31a can only be inserted in the lens mount structure when the lug 31a is in alignment with the opening 29a (Fig. 2). It will be observed that the formation or boss 31a has a cam shaped face 53, the purpose of which is to provide keying means, so that the lens barrel 20 can be attached to the lens mount structure only in one particular position or relation of parts. A second purpose of the said cam-shaped face 53 is to cause the bent-down end 44 of the locking lever or latch arm 43 to be thrust outwardly when the lens barrel is turned in a clockwise direction for the purpose of locking the lens barrel in place in the lens mount structure.

It will be apparent from the foregoing disclosure that I provide novel means permitting of rapid interchange of lenses of different focal length and for locking the substituted lens securely in its place in or to the camera. I have by my invention also provided means preventing the lens barrel from being inadvertently disengaged from the camera casing, because the lens structure cannot be turned in a contraclockwise direction without having first disengaged the locking end or lug 44 of the arm or lever 43 by pressing inwardly the L-shaped end 49 thereof. Otherwise the parts might be inadvertently disengaged through the turning of the focusing ring on the lens mount if turned beyond its intended extent of motion.

Since all the parts of the structure herein disclosed are so designed that their dimensions can be kept very accurate in the machining process, it follows that very high precision can be maintained in the application of various lenses to this mount.

A further advantage of the structure herein disclosed arises from the fact that it can be manufactured at low cost but that a high degree of precision of the parts can nevertheless be maintained.

Having thus described one embodiment of the invention, it is to be understood that although specific terms are employed, they are used in a generic and descriptive sense and not for purposes of limitation, the scope of the invention being set forth in the following claims.

I claim:

1. Means for rigidly but detachably securing a photographic lens barrel to a camera casing, comprising in combination, a lens barrel having a lens, a cover or mounting ring upon the camera casing to receive the lens barrel, the latter having a plurality of spaced, laterally extending, formations, one of which is of irregular contour having portions of different radial extent, the said cover or mounting ring having a like plurality of correspondingly spaced openings, at least one whereof is of the same irregular contour as that of the said irregular formation adapted to receive it, whereby the said formations and openings, when brought into respective alignment, may be interengaged for assembling the parts.

2. A combination according to claim 1, but in which there is provided a spacing or index ring having a radially extending formation adapted to be engaged by one of the said formations of the lens barrel in the step of removing the lens barrel from the assembly.

3. A combination according to claim 1, but in which a spacing or index ring 32 is provided having a radial formation 52 adapted to be engaged by one of the said laterally extending formations of the lens barrel in the step of removing the lens barrel from the assembly.

4. A combination according to claim 1, but in which there is a plurality of retaining springs adapted to engage faces of the said laterally extending formations of the lens barrel, thereby holding the latter in position.

5. A combination according to claim 1, but in which there is provided a locking lever having a formation adapted to engage one of the said laterally extending formations of the lens barrel, to prevent inadvertent removal of the lens barrel.

6. A combination according to claim 1, but in which there is provided a plurality of retaining springs to engage respectively laterally extending formations of the lens barrel, thereby holding the latter in position, and there is provided a locking lever adapted to engage one of the laterally extending formations to prevent inadvertent removal of the lens barrel.

7. A combination according to claim 1, but in which there is provided a locking lever having a formation adapted to engage the said irregularly contoured formation with which the lens barrel is provided.

8. Means for rigidly but detachably securing a photographic lens barrel to a camera casing, comprising a lens barrel having a lens, a cover or mounting ring upon the camera casing to receive said lens barrel, the lens barrel having a plurality of laterally extending formations 31, 31, 31a, at least one of which formations is of irregular contour having portions of different radial extent, and the cover or mounting ring having a like plurality of correspondingly spaced openings 29, 29, 29a, at least one of which is of the same irregular contour as that of the said irregular formation for receiving it, said formations and openings being adapted to be brought into respective alignment in assembling the parts.

9. Means for rigidly but detachably securing a photographic lens barrel to a camera casing, comprising a lens barrel having a lens, a cover or mounting ring upon the camera casing to receive said lens barrel, the lens barrel having a plurality of laterally extending formations 31, 31, 31a, at least one of which formations is of irregular contour having portions of different radial extent, and the cover or mounting ring having a corresponding plurality of spaced openings 29, 29, 29a, at least one of which is of the same irregular contour as that of the said irregular formation for receiving it, said formations and openings being adapted to be brought into respective alignment in assembling the parts, and a spring or springs 38 carried by said cover or mounting ring and each adapted to engage one of the formations 31 of the lens barrel when the said parts are sufficiently rotated in assembling, thereby holding the lens barrel in position.

10. Means for rigidly but detachably securing a photographic lens barrel to a camera casing, comprising a lens barrel having a lens, a cover or mounting ring upon the camera casing to receive said lens barrel, the lens barrel having a plurality of laterally extending formations at least one of which formations is of irregular contour having portions of different radial extent, and the cover or mounting ring having a corresponding number of similarly spaced openings, at least one of which is of the same irregular contour as that of the said irregular formation for receiving it, and an index member carried by said cover or mounting ring and having a formation 52 to be engaged by one of said laterally extending formations when the parts are in such relative circumferential position as permits the removal of the lens barrel.

11. Means for rigidly but detachably securing a photographic lens barrel to a camera casing, comprising a lens barrel having a lens, a cover or mounting ring upon the camera casing to receive said lens barrel, the said lens barrel having a series of spaced laterally extending formations at least one of which formations is of irregular contour having portions of different radial extent, and the cover or mounting ring having a like plurality of similarly spaced openings, at least one of which is of the same irregular contour as that of the said irregular formation for receiving it, said cover or mounting ring having an index ring 32 attached thereto provided with a formation 52 to be engaged by one of said projections when the parts are in such relative circumferential position as permits the removal of the lens barrel.

12. Means for rigidly but detachably securing a photographic lens barrel to a camera casing, comprising a lens barrel having a lens, a cover or mounting ring upon the camera casing to receive said lens barrel, the said lens barrel having a series of spaced, laterally extending formations at least one of which formations is of irregular contour having portions of different radial extent, and the cover or mounting ring having a like plurality of similarly spaced openings, at least one of which is of the same irregular contour as that of the said irregular formation for receiving it, the said cover or mounting ring having a plurality of retaining springs 36 therein having formations to engage faces of said laterally extending formations when the said parts are sufficiently rotated in assembling, thereby holding the lens barrel in position.

13. Means for rigidly but detachably securing a photographic lens barrel to a camera casing, comprising a lens barrel having a lens, a cover or mounting ring upon the camera casing to receive said lens barrel, the said lens barrel having a series of spaced, laterally extending formations at least one of which formations is of irregular contour having portions of different radial extent, and the cover or mounting ring having a like plurality of similarly spaced openings, at least one of which is of the same irregular contour as that of the said irregular formation for receiving it, the said cover or mounting ring having a plurality of retaining springs 36 therein having formations respectively to engage faces of said laterally extending formations, when the said parts are sufficiently rotated in assembling, thereby holding the lens barrel in position, and a locking lever 43 mounted in said cover or mounting ring and having a part to engage a face of one of said laterally extending formations.

14. Means for rigidly but detachably securing a photographic lens barrel to a camera casing, comprising a lens barrel having a lens, a cover or mounting ring upon the camera casing to receive said lens barrel, said lens barrel having an extension 24, 24a provided with a plurality of laterally extending, spaced formations 31, 31, 31a, and the cover or mounting ring having a like plurality of similarly spaced openings 29, 29, 29a to receive said formations, the said formation 31a having a cam face 53 constituting keying means and the opening 29a having a similar shape to receive said keying means, and an index ring 32 secured in said cover or mounting ring and having recesses 39, 39, to receive the formations 31, 31 and opening 40 to receive the formation 31a.

15. Means for rigidly but detachably securing a photographic lens barrel to a camera casing, comprising a lens barrel having a lens, a cover or mounting ring upon the camera casing to receive said lens barrel, said lens barrel having an extension 24, 24a provided with a plurality of laterally extending, spaced formations 31, 31, 31a, and the cover or mounting ring having a like plurality of similarly spaced openings 29, 29, 29a to receive said formations, the said formation 31a having a cam face 53 constituting keying means and the opening 29a having a similar shape to receive said keying means, and an index ring 32 secured in said cover or mounting ring and having recesses 39, 39 to receive the formations 31, 31 and opening 40 to receive the formation 31a, together with a locking lever 43 having a part to engage a face of the formation 31a.

16. Means for rigidly but detachably securing a photographic lens barrel to a camera casing, comprising a lens barrel having a lens, a cover or mounting ring upon the camera casing to receive said lens barrel, said lens barrel having an extension 24, 24a provided with laterally extending, spaced formations 31, 31, 31a, and the cover or mounting ring having similarly spaced openings 29, 29, 29a to receive said formations, the said formation 31a having a cam face 53 constituting keying means and the opening 29a having a similar shape to receive said keying means, and an index ring 32 secured in said cover or mounting ring and having recesses 39, 39 to receive the formations 31, 31 and opening 40 to receive the formation 31a, together with a locking lever 43 having a part to engage a face of the formation 31a, and a spring 51 cooperating with said locking lever to hold the same in locking relation to a face of said formation 31a.

ARCHIE H. GOREY.